United States Patent [15] 3,667,040
Grinoch [45] May 30, 1972

[54] SENSOR FOR DETECTING RADIO FREQUENCY CURRENTS IN CARBON BRIDGE DETONATOR

[72] Inventor: Abraham Grinoch, Morristown, N.J.
[73] Assignee: The United States of America as represented by the Secretary of the Army
[22] Filed: Sept. 28, 1970
[21] Appl. No.: 76,124

[52] U.S. Cl...................................................324/106, 324/95
[51] Int. Cl..........................................G01r 5/26, G01r 21/04
[58] Field of Search..................324/106, 95; 321/1, 5; 310/4; 136/207; 73/167

[56] References Cited

UNITED STATES PATENTS 3,518,542  6/1970  Harris.....................................324/106
3,147,436  9/1964  Hopfer...............................324/106 X Primary Examiner—Rudolph V. Rolinec
Assistant Examiner—Ernest F. Karlsen
Attorney—Harry M. Saragovitz, Edward J. Kelly and Herbert Berl

[57] ABSTRACT

This invention relates to an improved apparatus for monitoring induced electromagnetic current in carbon bridge detonators. A heat detecting means is held in close proximity to a chip bridge resistor, which simulates the carbon bridge in a carbon bridge detonator, to measure the heat radiated therefrom.

The invention described herein may be manufactured, used and licensed by or for the Government for governmental purposes without the payment to me of any royalty thereon.

2 Claims, 1 Drawing Figure

PATENTED MAY 30 1972
3,667,040
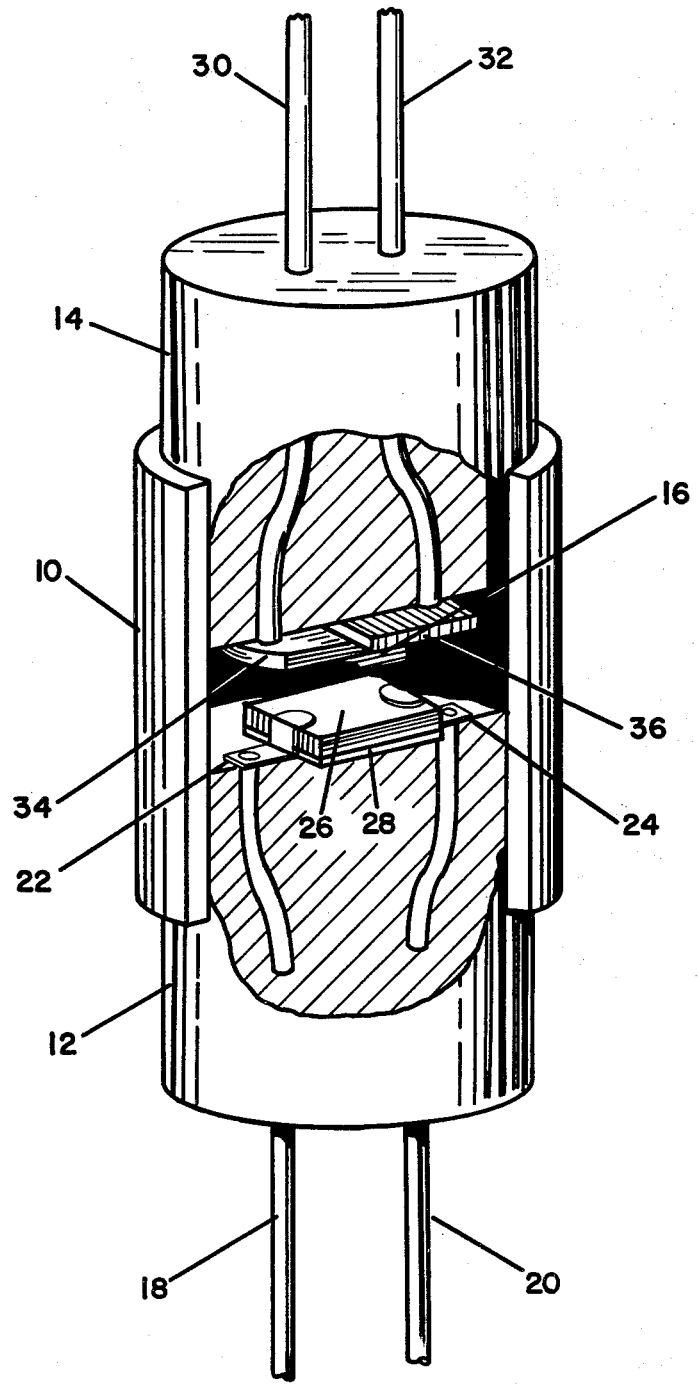
INVENTOR.
ABRAHAM GRINOCH
BY Harry M. Saragovitz
Edward J. Kelly
Herbert Berl

3,667,040

SENSOR FOR DETECTING RADIO FREQUENCY CURRENTS IN CARBON BRIDGE DETONATOR

BACKGROUND OF THE INVENTION

This invention will be most advantageously used where it is essential to predetermine the amount of radio frequency induced current that will be found in a carbon bridge detonator when exposed to an electromagnetic environment. Where it is of interest to determine induced currents in wire bridge detonators, no significant problems are encountered. One may make such a sensor by modifying the detonator, removing the explosive charge, and placing a sensitive thermocouple or other heat detecting means immediately adjacent to the bridge wire. A thermocouple is readily calibrated in terms of voltage output as a function of direct current into the bridge wire. This measurement can be relied upon for simulation because the impedance of the wire bridge does not change significantly by the current being passed through the wire element; the same resistance vs. current relationship will exist in the wire bridge detonator. However, problems are encountered with simulation where one tries to merely replace the explosive charge in carbon bridge detonators, and substitute a heat detecting means in close proximity. Such simulating means when used in carbon bridge detonators are unreliable because the carbon bridge element, used in conventional graze mode detonators, change their impedance as a function of the minimum threshold current needed for calibration. For good simulation of a carbon bridge detonator, the deposited resistor should have the same resistance versus current relationship or one significantly stable as to allow an interpolation of the results. Prior art sensors using carbon bridge detonator elements when tested at current levels necessary to predict initiation of the detonator's explosive are unreliable because of their impedance change.

The invention described herein, is a more reliable and stable apparatus for determining induced currents in carbon bridge detonators because it shows no appreciable change in impedance for values of current up to twice the current levels necessary to destroy the carbon bridge detonator. The use of a chip resistor, in the sensor is particularly desirable, not only because the chip resistor and the carbon bridge detonator have very similar characteristics, but also because resistor chips are very stable on shelf life unlike the poor shelf life of the carbon bridge element.

SUMMARY OF THE INVENTION

It is an object of the present invention to provide a sensor which can accurately monitor the induced currents that may be found in carbon bridge detonators when exposed to electromagnetic radiations.

Another object of this invention is to provide a sensor having a chip resistor whose impedance can be manufactured to closely match the impedance of a carbon bridge detonator element.

A further object of this invention is to provide a sensor having a chip resistor for detecting and simulating induced radio-frequency currents in a carbon bridge that shows no appreciable change in resistance for up to twice the current levels necessary to destroy a carbon bridge.

The principal object of this invention is to provide a sensor whose impedance can be accurately manufactured to match the impedance of carbon bridge element, that has the ability to handle twice the current level of a carbon bridge without significant change in resistance, which will remain stable as a function of shelf life, and will accurately monitor the currents induced in a carbon bridge detonator when subjected to electromagnetic radiations.

BRIEF DESCRIPTION OF THE DRAWING

To enable a better understanding of the present invention, a detailed description thereof is made in the accompanying drawing which illustrates a partial sectional view taken along the longitudinal axis of the sensor assembly.

DETAILED DESCRIPTION OF INVENTION

Referring now to the drawing, a retaining cylinder 10 is used to separate a cylindrical resistor chip insulator support plug 12 from a cylindrical thermocouple insulator support plug 14 so that thermocouple junction 16 is separated from a resistor chip 26 by a distance of several thousandths of an inch. Resistor chip support plug 12 has molded therein two firing leads 18 and 20 that are parallel to the longitudinal axis of the resistor chip support plug 12 and equally spaced from center line of resistor chip support plug 12. The top ends of firing leads 18 and 20 partly protrude out of the top surface of resistor chip support plug 12 to provide means for electrical contact to one end of both connecting strips 22 and 24.

The bottom portions of firing lead 18 and 20 partly protrude out of the bottom surface of resistor chip support plug 12 so that these leads may be connected to an energy source (not shown). The opposite ends of connecting strips 22 and 24 are each electrically connected to each end of the rectangular-shaped resistor chip 26. The bottom surface of the resistor chip 26 is integrally bonded to a thermal insulator substrate 28.

Thermocouple insulator support plug 14 which occupies the top half of retaining cylinder 10 has molded therein two instrumentation leads 30 and 32 that are electrically connected respectively, at the bottom surface of thermocouple insulator support plug 14 to one end of a first vacuum deposited thermocouple surface 34 and to one end of a second vacuum deposited thermocouple surface 36 of dissimilar material. The other ends of the thermocouple surfaces 34 and 36 overlap to form a thermocouple junction 16. The free ends of the instrumentation leads 30 and 32 are used to measure the voltage generated by the thermocouple junction 16 as a the absorbed heat radiated from the dissipation in the chip resistor caused by the induced currents. The sensor is calibrated in terms of voltage output of the thermocouple as a function of current into the chip resistor bridge.

One preferred embodiment of such a sensor for detecting radio frequency currents in carbon bridge detonators uses a commercially available thick film, chip resistor, of approximately 10,000 ohms resistance; it is mounted on the resistor chip support plug firing leads 18 and 20 and has connections made thereto by silver epoxy and silver paint. The vacuum deposited thermocouple surfaces 34 and 36, in this preferred embodiment, are respectively tellurium and palladium. The tellurium-palladium thermocouple junction 16 is positioned 0.003 of an inch away from adjacent surface of the chip resistor.

Thus, the invention provides an accurate resistance substitution for the carbon bridge detonator, having linear characteristics that are needed for measurement of detonator parameters. An improvement in measurement technique is realized by the use of this sensor because of its increased test capability and measurement accuracy. This invention provides a tool for engineering development work in the evaluation of weapons or systems susceptibility to electromagnetic fields to which that weapon or system may be subjected to throughout its life cycle. The knowledge gained by the use of this improved sensor in accurately detecting induced currents in carbon bridge detonators permits the redesign of the weapon system to minimize the amount of unwanted stray currents.

I wish it to be understood that I do not desire to be limited to the exact detail of construction shown and described; for obvious modification will occur to a person skilled in the art.

What is claimed is:

1. An apparatus for detecting and monitoring the induced currents found in carbon bridge detonators, which comprises:
   a hollow retaining cylinder having a first open end and a second open end.
   a cylindrical thermocouple insulator support plug partly held within said first open end;
   a plurality of instrumentation leads molded within said cylindrical thermocouple insulator support plug so that each of the ends of said instrumentation leads partly protrude from the top and bottom surfaces of said thermocouple insulator support plug;

a first thermocouple surface, partly deposited upon the bottom surface of said thermocouple insulator support plug, having one end of said thermocouple surface electrically connected to one of said instrumentation leads;

a second thermocouple surface, deposited upon the bottom surface of said thermocouple insulator support plug having one end of said thermocouple surface, electrically connected to one end of said instrument leads and having the other end of said second thermocouple surface overlap the first thermocouple surface so that a thermocouple junction is formed which completes the electrical circuit with said instrument leads;

a resistor chip;

a first contact strip having electrical contact to one end of said resistor chip;

a second contact strip having electrical contact to the second end of said resistor chip and separated from said first contact strip as to permit said resistor chip to have a predetermined value of impedance;

a thermal insulator substrate integrally bonded to the bottom surface of said resistor chip so as to provide a thermal barrier and an electrical insulating support for said resistor chip;

a cylindrical resistor chip insulator support plug held in said second open end of said retaining cylinder so as to permit the positioning of the top surface of said resistor chip insulator support plug a fixed distance from said thermocouple junction;

a first firing lead longitudinally oriented within said resistor chip insulator support plug, having one end protrude out of the top surface of said resistor chip insulator support plug to provide a terminal for electrically connecting the first contact strip, and extending out of the bottom surface of said resistor chip insulator support plug on the opposite end to provide a first input terminal; and a second firing lead longitudinally oriented within said resistor chip insulator support plug and separated from said first firing lead, having one end protrude out of the top surface of said resistor chip insulator support plug to provide a terminal for electrically connecting said second contact strip, extending out of the bottom surface of said resistor chip support plug on the opposite end to provide a second input terminal completing the electrical circuit to the chip resistor bridge so that when the above-described sensor is placed in an electromagnetic field, an induced current will flow in said chip resistor generating heat as a function of its impedance and current, which because of its proximity to said thermocouple junction will cause a voltage to be generated in said junction which accurately simulates the currents that would be induced in a carbon bridge detonator when subjected to the same electromagnetic radiation.

2. An apparatus for detecting and monitoring induced currents found in carbon bridge detonators as recited in claim 1 wherein said first thermocouple surface is tellurium and said second thermocouple surface is palladium.

* * * * *